United States Patent
Liljenstam et al.

(10) Patent No.: US 9,380,071 B2
(45) Date of Patent: Jun. 28, 2016

(54) METHOD FOR DETECTION OF PERSISTENT MALWARE ON A NETWORK NODE

(75) Inventors: Michael Liljenstam, Solna (SE);
András Méhes, Sundbyberg (SE);
Patrik Salmela, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 14/363,484

(22) PCT Filed: Apr. 2, 2012

(86) PCT No.: PCT/SE2012/000048
§ 371 (c)(1),
(2), (4) Date: Jun. 6, 2014

(87) PCT Pub. No.: WO2013/089607
PCT Pub. Date: Jun. 20, 2013

(65) Prior Publication Data
US 2015/0180898 A1    Jun. 25, 2015

Related U.S. Application Data

(60) Provisional application No. 61/569,343, filed on Dec. 12, 2011.

(51) Int. Cl.
*H04L 29/06* (2006.01)
*H04W 12/12* (2009.01)
*H04L 12/26* (2006.01)
*G06F 21/56* (2013.01)

(52) U.S. Cl.
CPC ............ *H04L 63/1441* (2013.01); *G06F 21/56* (2013.01); *H04L 43/16* (2013.01); *H04L 63/145* (2013.01); *H04L 63/1425* (2013.01); *H04W 12/12* (2013.01)

(58) Field of Classification Search
CPC ...... H04L 63/1425; H04L 63/14; H04L 43/16
See application file for complete search history.

(56) References Cited

U.S. PATENT DOCUMENTS

| 7,743,419 | B1 | 6/2010 | Mashevsky et al. |
| 2008/0307526 | A1 | 12/2008 | Chung et al. |
| 2009/0044276 | A1 | 2/2009 | Abdel-Aziz et al. |
| 2011/0202997 | A1* | 8/2011 | Chandrashekar ... H04L 63/1441 726/22 |
| 2011/0252472 | A1 | 10/2011 | Ehrlich et al. |

FOREIGN PATENT DOCUMENTS

| EP | 1906620 A1 | 4/2008 |
| EP | 2247064 A2 | 3/2010 |

* cited by examiner

*Primary Examiner* — Izunna Okeke
(74) *Attorney, Agent, or Firm* — Murphy, Bilak & Homiller, PLLC (57) ABSTRACT

The present invention relates to methods and devices for detecting persistency of a first network node (12). In a first aspect of the invention, a method is provided comprising the steps of monitoring (S101), during a specified observation period, whether the first network node has established a connection to a second network node (13), and determining (S102) a total number of sessions of connectivity occurring during said specified observation period in which the first network node connects to the second network node. Further, the method comprises the steps of determining (S103), from the total number of sessions, a number of sessions comprising at least one communication flow between the first network node and the second network node, and determining (S104) inter-session persistence of the first network node on the basis of the total number of sessions and the number of sessions comprising at least one communication flow.

18 Claims, 5 Drawing Sheets

METHOD FOR DETECTION OF PERSISTENT MALWARE ON A NETWORK NODE

TECHNICAL FIELD

The invention relates to methods of, and devices for, detecting persistency of a first network node.

BACKGROUND

Persistent malware is a common type of malware that installs itself on a device and is thus able to perform actions whenever the device is on. So called bots (participating in botnets) can be classified as persistent malware that utilize a network and are widely held as one of the most serious threats on the Internet today. In general usage, the term "bot" refers to a computer infected with malware that allows the attacker to remotely control the computer to perform tasks on the behalf of the attacker, such as sending spam, stealing information, or launching attacks against other computers. A botnet is a collection of such bots under common control. Many techniques already exist for detecting malware infections on computers and other devices with similar capabilities, such as phones, tablets, etc. Existing host-based techniques include signature scanning for infected and manipulated files and behavioural monitoring for unusual and/or suspect processes on the device. Similarly, common network-based techniques rely on detecting signatures of attacks or malware communications or abnormal or suspect communication patterns, likely related to malware infections. Most techniques depend on capture and manual analysis of malware samples to create detection rules for that specific malware.

Existing malware detection techniques to date known by the inventors are imperfect in terms of detection performance and their capabilities depend on where they are deployed, e.g., on the host or in the network. Since there is a constant arms-race between malware writers and the security industry trying to defend the users, there is constantly a need for new techniques to improve detection of threats such as persistent network-using malware.

SUMMARY

An object of the present invention is to solve, or at least mitigate these problems in the art and provide an improved method and device for detecting malicious devices in networks.

This object is attained in a first aspect of the invention by a method of detecting persistency of a first network node. The method comprises the steps of monitoring, during a specified observation period, whether the first network node has established a connection to a second network node, and determining a total number of sessions of connectivity occurring during said specified observation period in which the first network node connects to the second network node. Further, the method comprises the steps of determining, from the total number of sessions, a number of sessions comprising at least one communication flow between the first network node and the second network node, and determining inter-session persistence of the first network node on the basis of the total number of sessions and the number of sessions comprising at least one communication flow.

This object is attained in a second aspect of the invention by a method of detecting persistency of a first network node. The method comprises the steps of monitoring, during a specified observation period, whether the first network node has established a connection to a second network node, and determining a total number of sessions of connectivity during which the first network node connects to the second network node during said specified observation period. Further, the method comprises the steps of determining, from the total number of sessions, a number of sessions comprising at least one communication flow between the first network node and the second network node, and dividing at least one session into a number of sub-sessions. Then, the number of sub-sessions comprising at least one communication flow between the first network node and the second network node is determined for the at least one session, and intra-session persistence of the first network node is determined for the at least one session on the basis of the number of sub-sessions and the number of sub-sessions comprising at least one communication flow.

Advantageously, the present invention targets persistent malware which may utilize the network for attacks, remote control and/or malware updates, etc. To this end, commonalities can be found in communication patterns between devices involved in malicious and/or suspect network activities (or at least some heuristics for detecting malicious/suspected attack behavior), such as sending spam, and add to this detection of a characteristic persistence by the malware to establish network communications. For instance, bots participating in a botnet (spam-sending or otherwise) will repeatedly attempt to "call home" to one or more command and control (C&C) servers. This will generally happen repeatedly whenever the device is on and connected to the network, and repeatedly over time as the device is on and connected.

Hence, signaling information in the network is utilized to determine periods when the device is on and connected to the network, i.e., periods when the persistent malware has an opportunity to use the network. Three exemplifying embodiments which facilitate determination of sessions of connectivity include:

monitoring network attach/detach or Packet Data Protocol (PDP) context setup/release signaling (for 3GPP mobile networks), and monitoring Dynamic Host Configuration Protocol (DHCP) signaling for periods when the device has been allocated an IP address (for fixed networks).

When the sessions of connectivity have been detected, it is determined whether there is suspect activity, for instance, connections to certain destinations, which appears to be persistent within and across sessions. Such persistence across and during sessions is an indication of a persistent behavior of the network device, which could be either benevolent or malicious. Thus, in the first aspect of the present invention, inter-session persistence of the first network node is determined, whereas in the second aspect of the present invention, intra-session persistence of the first network node is determined. In further embodiments of the present invention, the subject-matter of the first and second aspects can be combined, resulting in an approach where both inter-session persistence and intra-session persistence is used to further strengthen detection of persistency of the first network node. Optionally, this can combined with other information about potentially malicious traffic that is originated by the first network node in order to provide evidence of a persistent malware infection. Thus, the present invention advantageously targets persistent malware that utilizes the network for attacks, remote control and/or malware updates.

In the following, embodiments of the first and the second aspect of the present invention will be discussed.

In an embodiment of the present invention, the determination of inter-session persistence comprises determining an inter-session persistence ratio by diving the number of sessions comprising at least one communication flow with said total number of sessions, and comparing the determined inter-session persistence ratio to a threshold value, wherein the first network node is considered to be persistent if said ratio exceeds the threshold value. Advantageously, by selecting an appropriate threshold value with which the inter-session persistence ratio is determined, an indication is given whether the behaviour of the first network node should be considered malicious.

In a further embodiment of the present invention, the determination of intra-session persistence comprises dividing at least one session into a number of sub-sessions, and determining for the at least one session, the number of sub-sessions comprising at least one communication flow between the first network node and the second network node, wherein intra-session persistence of the first network node is determined. Further, in yet another embodiment, an intra-session persistence ratio is determined for the at least one session by diving the number of sub-sessions comprising at least one communication flow with said total number of sub-sessions for the at least one session, and comparing the determined intra-session persistence ratio to a threshold value, wherein the first network node is considered to be persistent if said ratio exceeds the threshold value. Advantageously, by selecting an appropriate threshold value with which the intra-session persistence ratio is determined, an indication is given whether the behaviour of the first network node should be considered malicious.

In yet another embodiment of the present invention, an instant of time when a first communication flow occurs between the first network node and the second network node during the specified observation period is recorded. If the first network node becomes infected by malware some time during a first specified observation period, it may not be detected until a subsequent observation period. By ignoring the time before the first contact, i.e. when a first communication flow occurs, it will be easier to manage a situation where the first network node becomes infected and starts behaving persistent during a given observation period.

In still another embodiment of the present invention, the communication flows between the first network node and the second network node are aggregated into a communication flow set/flow aggregate during the specified observation period. This will advantageously facilitate managing of large flow sets in that e.g. a single flow easily can be filtered out.

The object of the present invention is further attained by devices for detecting persistency of a first network node corresponding to methods of the first and second aspect of the present invention discussed hereinabove.

Advantageously, the present invention utilizes network information, and performs analysis thereof to detect malware. Persistent malware, such as bots, tend to make use of network connections as much as possible to provide maximum effect for the malware writer, and network signalling information is advantageously used to determine whether the malware is active on the network when the device has established a connection to the network. This translates to improved detection performance and reduced false positive rates, which are both important to provide better protection against malware and to reduce costs associated with manual analysis of detection alerts.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

The present invention may be implemented in the context of a mobile network. Without loss of generality, sessions of connectivity are, in embodiments of the invention, determined by means of using PDP context signalling. The PDP context is a data structure located at the Serving GPRS Support Node (SGSN) and the Gateway GPRS Support Node (GGSN) containing the subscriber's session information when the subscriber has an active session. When a mobile module wants to use GPRS, it must first attach and then activate a PDP context. This allocates a PDP context data structure in the SGSN that the subscriber is currently visiting and the GGSN serving the subscriber's access point. Thus, the PDP context is advantageously used to determine sessions of connectivity of a first network node; by studying the PDP context, it can be determined whether the potentially malicious first network node is connected to the network or not. As previously mentioned, sessions is in an alternative embodiment determined using an International Mobile Subscriber Identity (IMSI) network attach/detach procedure, or other events in the control plane (aka, related to "signalling"). Furthermore, although the procedure is described in terms of a single PDP context per user, extending it to multiple simultaneous PDP contexts should be obvious to those skilled in the art.

Figure 1:
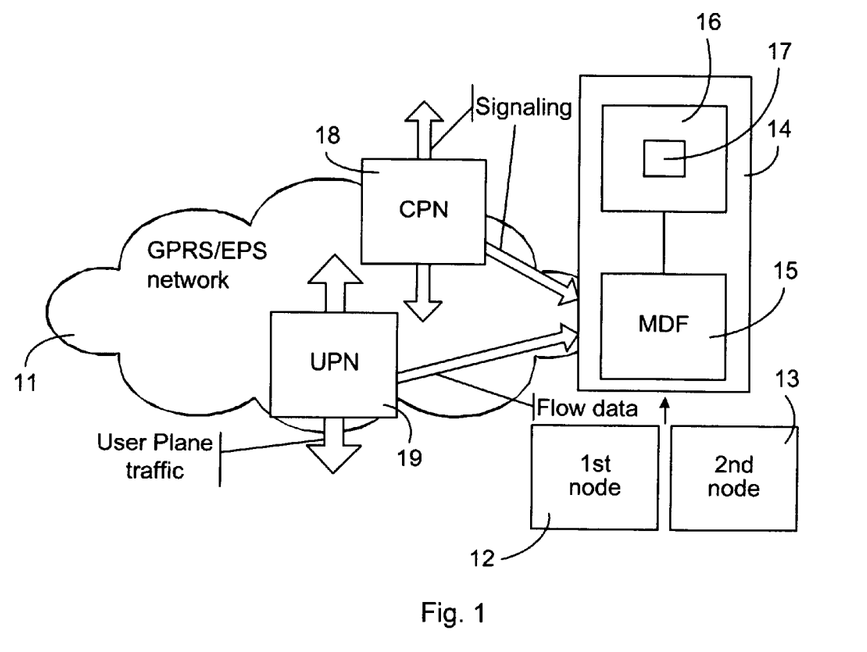
FIG. 1 illustrates a mobile network where the present invention is implemented.

FIG. 1 provides an illustration of a mobile network where the present invention is implemented. The method according to embodiments of the present invention is for illustrating purposes carried out by a Malware Detection Function (MDF) 15 which relies on information collected from nodes in the mobile network 11.

The detection of persistency of a first network node 12 when establishing, or attempting to establish, communication with a second network node 13 according to embodiments of the present invention could be undertaken by a GGSN 14 in which the MDF 15 is implemented. It should be noted that the MDF 15 could be implemented in other network components than GGSN 14, such as e.g. in a Radio Network Controller (RNC) in case of a 3G network or in a core network Mobility Management Entity (MME) in case of a Long Term Evolution (LTE) network, in an eNodeB/Node B, general routers, switches, or security appliance like Intrusion Detection/Prevent Systems or firewalls. Thus, functionality for detecting persistency of a network node as defined by different embodiments of the present invention is not necessarily contained in a single network component, but could be distributed among a plurality of network components. An advantage of implementing the MDF 15 in a node such as GGSN (or SGSN) is that it has access to signaling (PDP context) and traffic flows for a large population of users. If instead IMSI network attach/detach signaling is utilized for determining sessions of connectivity, the MME is an advantageous option. If the functionality is moved further out into the Radio Access Network (RAN), to the RNC or even to the NodeB/eNodeB, it is still possible to attain session information but for smaller sets of users. In a fixed network, the router/switch/node may listen in to Authentication, Authorization, and Accounting (AAA) or DHCP signaling, or the signaling information could be provided by the AAA or DHCP servers themselves. Further, any of the above nodes could forward the information to a server that runs an application implementing the invention in a Security Operations Center or Network Operations Center, or similar.

In practice, the MDF is embodied in the form of one or more microprocessors arranged to execute a computer program 17 downloaded to a suitable storage medium 16 associated with the microprocessor, such as a RAM, a Flash memory or a hard disk. The microprocessor 15 is arranged to at least partly carry out the method according to embodiments of the present invention when the appropriate computer program 17 comprising computer-executable components is downloaded to the memory 16 and executed by the microprocessor 15. The storage medium 16 may be a computer program product comprising the computer program 17. Alternatively, the computer program 17 may be transferred to the storage medium 16 by means of a suitable computer program product, such as a floppy disk, a compact disc or a memory stick that is carrying the computer program 17. As a further alternative, the computer program 17 may be downloaded to the storage medium 16 over a network. The microprocessor 15 may alternatively be embodied in the form of an application specific integrated circuit (ASIC), a field-programmable gate array (FPGA), a complex programmable logic device (CPLD), etc.

With further reference to FIG. 1, control plane information is gathered from a control plane node 18 (or plurality of nodes) with access to control plane traffic, such as a router or switch, or some mobile network specific node such as a GGSN, Packet Data Network GateWay (PDN-GW), Serving GateWay (SGW), SGSN, MME, RNC, BSC, NodeB, eNodeB, or similar. Mobile network control plane information may include information about network attach/detach events or PDP context activation/deactivation events, or other events related to the data connectivity of a device such as the first network node 12. In addition, certain related or similar information might be retrieved from DHCP server(s) or AAA server(s). A further possibility is to gather supplemental control plane information from user equipment. Unless stated otherwise, the following description focuses on control plane information from mobile network nodes. A signalling analysis function in the MDF 15 receives the control plane information and extracts information related to network attach/detach and/or PDP context events to create first node session information for further analysis. It also extracts a persistent subscriber identifier and its (possibly time-varying) binding(s) to a "current" IP address to attribute traffic to a subscriber. (Use of information from DHCP or AAA is described in relation to fixed access below, but could also be an option for mobile access.)

Traffic plane information, at flow (such as NetFlow or similar flow summarization records) or packet level (full or partial packet capture), is collected from a node with access to user plane traffic, i.e. a user plane node 19 such as a router or switch, or some mobile network specific node such as a GGSN, PDN-GW, SGW, SGSN, RNC, BSC, NodeB, eNodeB, or similar. An additional possibility is to gather supplemental traffic information from user equipment. A traffic analysis function in the MDF 15 receives user plane traffic information and aggregates it to flows (if it was not already at flow level), if necessary. It also receives control plane related information from the signalling analysis function and uses it to assign subscriber identifiers to the traffic flows.

A persistence analysis function in the MDF 15 may receive information about user sessions from the signalling analysis function and information about user traffic flows from the traffic analysis function in order to find persistent connections.

An attack/suspect analysis function may receive information from network security nodes, such as firewalls, intrusion detection systems, spam filtering appliances, unified threat management appliances, end point security software in user equipment, or similar, about attacks and unwanted traffic. It can also receive information from operations and management nodes in the network that indicate that some traffic causes network problems or is suspect in this respect. Such incoming alerts are processed (could for instance be correlated) and passed on for further analysis.

A correlation function may use traffic information from the traffic analysis function, information on persistent connections from the persistence analysis function, and incoming alerts from the attack/suspect analysis function to check if troublesome behavior appears to be correlated with persistent connections that could indicate remote control causing the troublesome behavior. If it finds supporting evidence for persistent malware causing the issue, it sends an alert to an alerting function that can alert the network operator staff and/or affected subscribers.

Figure 2:
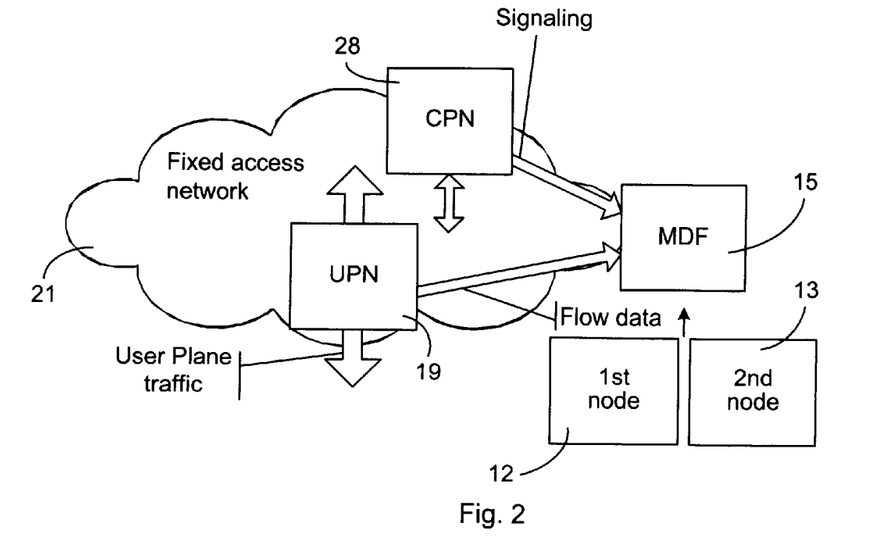
FIG. 2 illustrates a fixed access network where the present invention is implemented.

With reference to FIG. 2, the present invention could also be implemented in a fixed access network 21, where the same reference numerals denote the same type of network components as discussed in connection to FIG. 1. A difference between implementation in a fixed network as compared to a wireless network is the type of signalling information used, wherein DHCP server(s) and/or AAA server(s) 28 are used in the fixed network 21. Active user authentication periods (from AAA server) or active IP leases (from DHCP server) can be used as indications of sessions of connectivity and to associate a permanent network node identifier to the IP address. Consequently, the internal workings of the MDF 15 are essentially the same, but the input provided to the signalling analysis function is slightly different.

Figure 3:
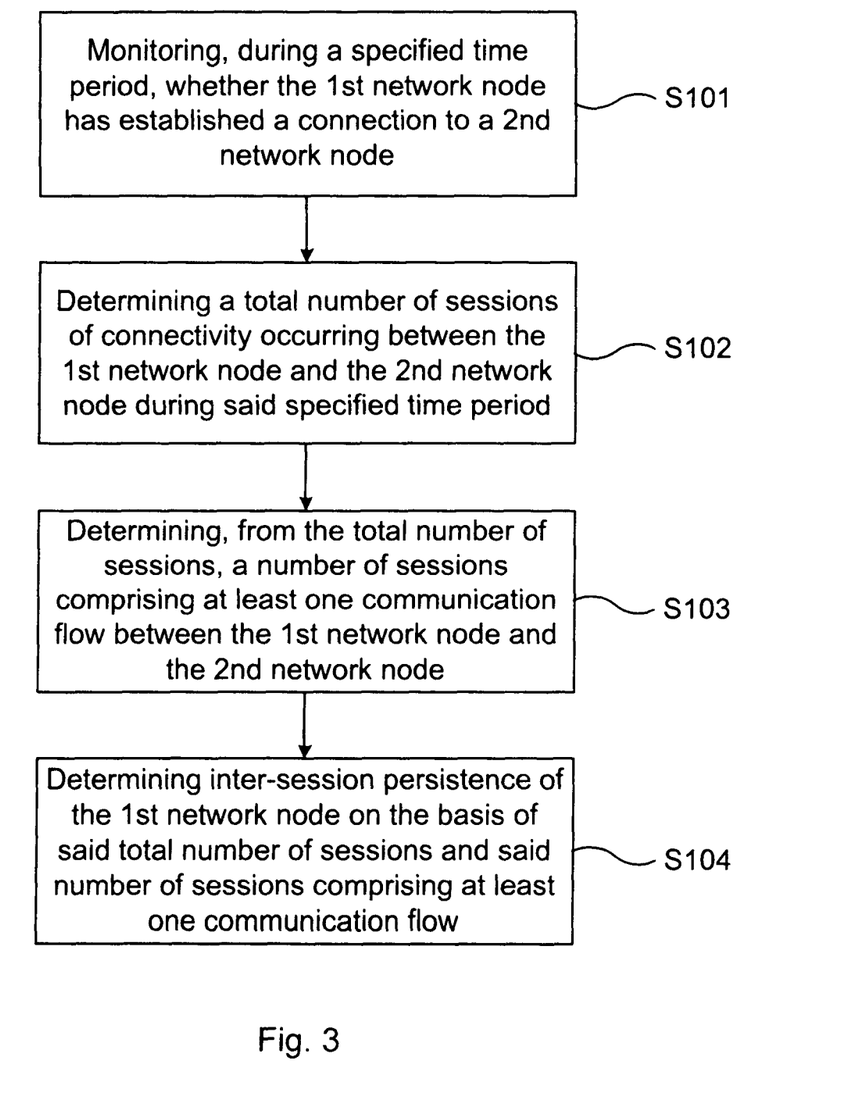
FIG. 3 shows a flowchart illustrating a method of detecting persistency of a first network node according to an embodiment of the present invention.

FIG. 3 shows a flowchart illustrating a method of detecting persistency of a first network node according to an embodiment of the present invention. The MDF 15, which may be implemented in the GGSN 14 as previously has been described, monitors during a specified observation period in step S101 whether the first network node 12 has established a connection to a second network node 13. Then, the MDF 15 determines in step S102 a total number of sessions of connectivity occurring during the specified observation period between the first network node 12 and the second network node 13. This may be implemented by means of analysing the PDP context. Then, in step S103, from the total number of sessions, a number of sessions comprising at least one communication flow are determined between the first network node 12 and the second network node 13. Finally, in step S104, the MDF 15 determines inter-session persistence of the first network node 12 on the basis of said total number of sessions and the number of sessions comprising at least one communication flow. Even though the method illustrated in FIG. 3 shows the detection of network node persistency between the first network node 12 and a single second network node 13, the persistency detection can in practice be carried out for a number of different destination network nodes.

Figure 4:
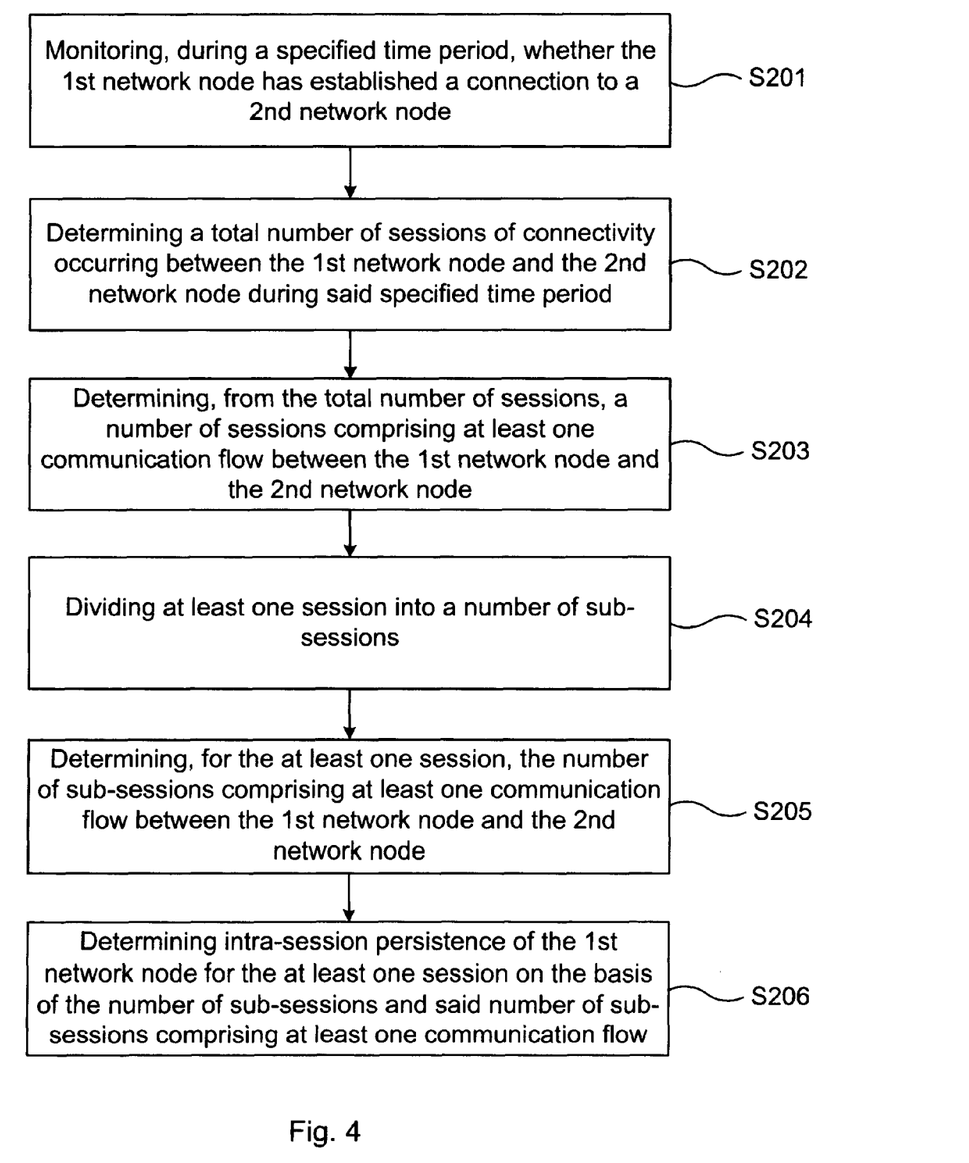
FIG. 4 shows a flowchart illustrating a method of detecting persistency of a first network node according to another embodiment of the present invention.

FIG. 4 shows a flowchart illustrating a method of detecting persistency of a first network node according to another embodiment of the present invention. The MDF 15 implemented for instance in the GGSN 14 monitors, during a specified observation period in step S201, whether the first network node 12 has established a connection to a second network node 13. Then, the MDF 15 determines in step S202 a total number of sessions of connectivity occurring between the first network node and the second network node during said specified observation period, and determines in step S203—from the total number of sessions—a number of sessions comprising at least one communication flow between the first network node 12 and the second network node 13. Thus, as can be seen in the flowchart of FIG. 4, the first three steps S201-S203 of the method of this particular embodiment of the invention are identical to the first three steps S101-S103 of the method illustrated in FIG. 3. Further, in step S204, at least one session is divided into a number of sub-sessions and it is determined in step S205, for the at least one session, the number of sub-sessions comprising at least one communication flow between the first network node 12 and the second network node 13. Finally, in step S206, the MDF 15 determines intra-session persistence of the first network node 12 for the at least one session on the basis of the number of sub-sessions and said number of sub-sessions comprising at least one communication flow.

As previously mentioned, the respective embodiment of FIGS. 3 and 4 can be combined into a method where both inter-session persistence and intra-session persistence is determined to identify malicious network nodes. This embodiment of the present invention is illustrated in the flowchart set forth in FIG. 5. As described in connection to FIGS. 3 and 4, the MDF 15 monitors during a specified observation period in step S301 whether the first network node 12 has established a connection to a second network node 13. Then, the MDF 15 determines in step S302 a total number of sessions of connectivity occurring during the specified observation period between the first network node 12 and the second network node 13. This may be implemented by means of analysing the PDP context. Then, in step S303, from the total number of sessions, a number of sessions comprising at least one communication flow are determined between the first network node 12 and the second network node 13. In step S304, the MDF 15 determines inter-session persistence of the first network node 12 on the basis of said total number of sessions and the number of sessions comprising at least one communication flow. Further, in this particular embodiment, after step S303 has been performed, at least one session is divided into a number of sub-sessions in step S305. Thereafter, it is determined in step S306, for the at least one session, the number of sub-sessions comprising at least one communication flow between the first network node 12 and the second network node 13. Further, in step S307, the MDF 15 determines intra-session persistence of the first network node 12 for the at least one session on the basis of the number of sub-sessions and said number of sub-sessions comprising at least one communication flow.

Figure 5:
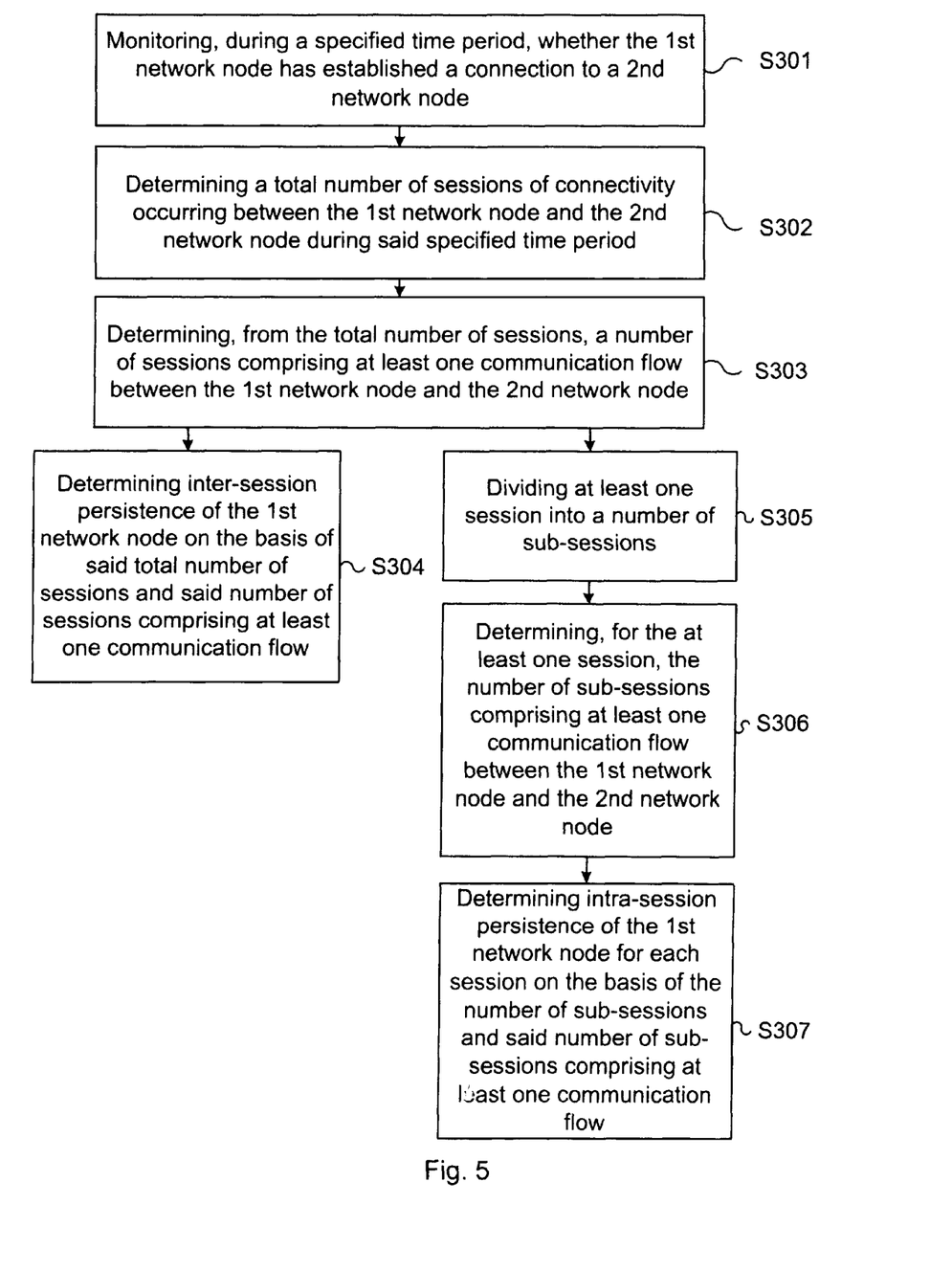
FIG. 5 shows a flowchart illustrating a method of detecting persistency of a first network node according to a further embodiment of the present invention.

With reference to FIG. 5, it should be noted that step S304 may be performed simultaneously with steps S305-S307. However it is also possible that step S304 is performed before steps S305-S307, or vice versa.

Figure 6:
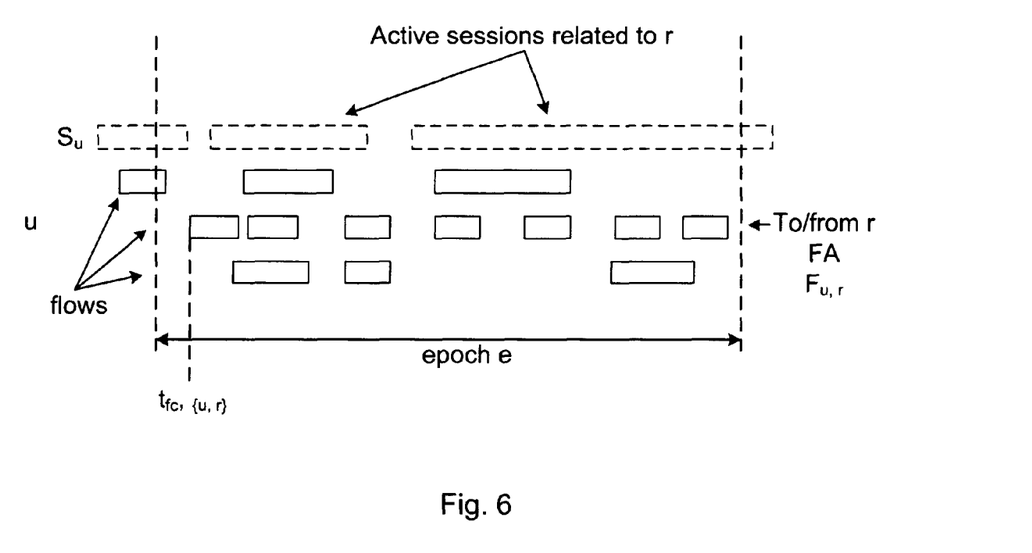
FIG. 6 shows a scheme illustrating a more elaborate method of detecting persistency of a first network node according to a further embodiment of the present invention.

With reference to FIG. 6, a more elaborate method of detecting persistency of a first network node is illustrated according to an embodiment of the invention. In the traffic plane, bidirectional (IP) flows, defined by the five tuple <source identifier, source port, transport protocol, destination identifier, destination port>, i.e. defining information regarding the first and second network node, respectively, and possibly a protocol-defined end event or time out, are aggregated as follows: flows from a particular source/first node identifier 12 to a particular destination service/second network node 13 (destination identifier and port) are grouped together into a set of communication flows known as a Flow Aggregate (FA). The first network node 12 is defined as the initiator of the flow. The source or destination identifier (depending on initiator flow direction) on the subscriber side can be identified by IP address, but preferably a more persistent identifier is used such as the IMSI for subscriber identity. In the context of 3GPP mobile network, the subscriber identifier (IMSI) is used instead of the source node IP address to avoid conflating end point information due to use of dynamically allocated IP addresses (for instance using DHCP). On the other side (usually outside the subscriber network), the end point may be identified by IP address or DNS name.

Each Flow Aggregate is cross-checked against signalling information about sessions for the subscriber. This may, e.g., be PDP context information or packet network attach/detach signalling. A session is delimited by the time from the start to the end of a PDP context, or the time from attach to detach, depending on which type of information is used.

A specified observation period known as an observation epoch constitutes the time period during which flow information is collected. FIG. 6 illustrates PDP contexts and traffic flows (shown on different lines for different remote end points) for a user. The figure also illustrates an arbitrary observation epoch, where observed PDP contexts and flows are, at least partially, inside the epoch. The top row of FIG. 4 illustrates active sessions related to a second network node r. The subsequent three rows illustrate three different communication flows from a first network node u to a respective destination network node, where the middle row illustrates communication flows between the first network node u and the second network node r to be monitored.

Thus, a specified observation period, or observation epoch e starts at time $t_{1,e}$ and ends at $t_{2,e}$.

A Flow Aggregate (FA) $F_{u,r}$ is defined to comprise the set of communication flows from first node u (e.g. identified by IMSI) to remote end point/service/second node r (where the remote endpoint/service is defined in terms of IP/DNS name and optionally port/protocol) during the observation epoch, i.e.

$\forall f \in F_{u,r}: t_{2,f} \geq t_{1,e} \wedge t_{1,f} \leq t_{2,e}$ where $t_{1,f}$ and $t_{2,f}$ are start and end times of f.

$F_{u,r}'$ is defined as a superset ($F_{u,r}' \supseteq F_{u,r}$) which may include flows prior to the observation epoch (i.e. optionally with some historic information).

The instant of time when a first communication flow occurs between the first network node and the second network node during the specified observation period is denoted $t_{fc,\{u,r\}}$ for $F_{u,r}'$, i.e. the first contact time to remote end point/service r from first network node u, possibly drawing upon historic information.

It is assumed the first network node u has a set of sessions $S_u$ occurring in e. That is, $S_u$ contains sessions $s_u$ for u with a start and/or end time inside the epoch, i.e., for $\forall s_u \in S_u$ it holds that $t_{2,su} \geq t_{1,e} \vee t_{1,su} \leq t_{2,e}$, where $t_{1,su}$ and $t_{2,su}$ are start and end times of $s_u$, respectively.

The set of sessions $S_{\{u,r\}}$ (where $S_{\{u,r\}} \subseteq S_u$) for $F_{u,r}$ is the set of all sessions for first network node u which have an end time after the first time of contact $t_{fc,\{u,r\}}$ to/from second network node r, and a start time before the end of the observation epoch $t_{2,e}$. That is, $S_{\{u,r\}}$ is a subset defined relative to traffic to/from the specific remote end point/service/second node r.

The set of active sessions for first node u to/from remote end point/service r is $S_{active,u,r} = \forall s \in S_{\{u,r\}}$: $(\exists f \in F_{u,r} \wedge t_{1,f} \geq t_{1,s} \wedge t_{2,f} \leq t_{2,s})$, where $F_{u,r}$ is the set of flows from/to first node u to/from remote end point/service/ second node r, $t_{1,f}$ and $t_{2,f}$ are start and end times of f, and $t_{1,s}$ and $t_{2,s}$ are start and end times of s. That is, all sessions with at least one flow to/from remote end point/ service r.

Sessions are divided into session periods $p_i$ of some fixed size, e.g., 10 minutes, relative to the beginning of the session (or some other time point).

The set of session periods for first node u, called $P_u$, contains all periods belonging to $S_u$ with a start and/or end time inside the epoch, i.e., for $\forall p_{u,i} \in P_u$ it holds that $t_{2,pu,i} \geq t_{1,e} \vee t_{1,pu,i} \leq t_{2,e}$, where $t_{1,pu,i}$ and $t_{2,pu,i}$ are start and end times of $p_{u,i}$.

The set of session periods $P_{\{u,r\}}$ (where $P_{\{u,r\}} \subseteq P_u$) for $F_{u,r}$ is the set of all periods within sessions in $S_{\{u,r\}}$ (the set of session for $F_{u,r}$) with an end time after $t_{fc,\{u,r\}}$ (the first time of contact) and a start time before $t_{c,2}$ (the end of the observation epoch). That is, $P_{\{u,r\}}$ is a subset defined relative to traffic to/from the specific remote end point/ service/second node r.

The set of active session periods $P_{active,u,r}$ for first node u to/from remote end point/service r is $P_{active,u,r} = \forall p \in P_\alpha$: $(\exists f \in F_{u,r} \wedge t_{2,f} \geq t_{2,p} \wedge t_{1,f} \geq t_{2,p})$, where $t_{1,p}$ and $t_{2,p}$ are start and end times of p. That is, all session periods with at least one flow (in $F_{u,r}$) to/from remote end point/service/ second node r.

The total number of sessions for first node u related to remote end point/service r is $|S_{\{u,r\}}|$ (the number of elements in the set of sessions for first node u related to second node r).

The number of active sessions for first node u to/from remote end point/service r is $|S_{active,u,r}|$.

The total number of session periods for first node u related to remote end point/service r is $|P_{\{u,r\}}|$ (the number of elements in the set of sessions periods for first node u related to second node r).

The number of active session periods for first node u to/from remote end point/service/second node r is $|P_{active,u,r}|$.

The inter-session persistence ratio for $F_{u,r}$ is $|S_{active,u,r}| \div |S_{\{u,r\}}|$ (i.e, the number of active sessions divided by the total number of sessions related to the remote end point/service/second node r).

The intra-session persistence ratio for $F_{u,r}$ is $|P_{active,u,r}| \div |P_{\{u,r\}}|$ (i.e., the number of active session periods divided by the total number of session periods related to the remote end point/service/second node r).

To detect persistent network-using malware, tests for persistent control connections established by a first network node involving the number of active session periods $|P_{active,u,r}|$, the inter-session persistence ratio $|S_{active,u,r}| \div |S_{\{u,r\}}|$, and the intra-session persistence ratio $|P_{active,u,r}| \div |P_{\{u,r\}}|$ to a common remote end point/service/second network node r can be combined with tests of similarities in attack or suspect behavior (for instance, sending spam). That is, for devices (each one tied to a subscription) involved in the same type of suspect behavior, persistent connections to/from the same remote end point/service are investigated, which would indicate centralized control (and provides further evidence of remote-controlled malware or, e.g., malware exfiltrating information).

As previously has been discussed, in embodiments of the present invention, the inter-session persistence ratio and the intra-session persistence ratio could be compared to selected threshold values in order to determine whether persistency is present. In practice, these threshold values are calibrated by performing field tests to find suitable values. Further, when persistent malware has been detected, an alarm can be raised to a security operations center for verification and/or to the destination network for taking remediating action.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of detecting persistency of a first network node, the method comprising:
    monitoring, during a specified observation period, whether the first network node has established a connection to a second network node;
    determining a total number of sessions of connectivity occurring between the first network node and the second network node during said specified observation period;
    determining, from the total number of sessions, the number of sessions that comprise at least one communication flow between the first network node and the second network node;
    determining inter-session persistence of the first network node, by determining an inter-session persistence ratio based on dividing the number of sessions that comprise at least one communication flow between the first and second network nodes with said total number of sessions;
    determining intra-session persistence of the first network node for at least one session that is divided into a number of sub-sessions, by determining an intra-session persistence ratio based on dividing a number of sub-sessions that comprise at least one communication flow between the first and second networks with said number of sub-sessions; and
    considering the first network node to be persistent if either said inter-session persistence ratio exceeds a first threshold value, or if said intra-session persistence ratio exceeds a second threshold value, or both.

2. The method of claim 1, wherein determining the total number of sessions of connectivity comprises monitoring network attach and detach information of the first network node.

3. The method of claim 1, wherein determining the total number of sessions of connectivity comprises monitoring packet data protocol (PDP) context information of the first network node.

4. The method of claim 1, wherein determining the sessions of connectivity comprises monitoring dynamic host configuration protocol (DHCP) requests and releases of the first network node.

5. The method of claim 1, further comprising sending an alert indicating that the first network node acts persistently.

6. The method of claim 1, further comprising recording an instant of time when a first communication flow occurs between the first network node and the second network node during the specified observation period.

7. The method of claim 1, further comprising aggregating the communication flows between the first network node and the second network node during the specified observation period.

8. A method of detecting persistency of a first network node, the method comprising:
monitoring, during a specified observation period, whether the first network node has established a connection to a second network node;
determining a total number of sessions of connectivity occurring between the first network node and the second network node during said specified observation period;
determining, from the total number of sessions, the number of sessions that comprise at least one communication flow between the first network node and the second network node;
dividing at least one session into a number of sub-sessions;
determining, for the at least one session, the number of sub-sessions that comprise at least one communication flow between the first network node and the second network node;
determining inter-session persistence of the first network node on the basis of said total number of sessions and said number of sessions that comprise at least one communication flow; and
determining intra-session persistence of the first network node for the at least one session on the basis of the number of sub-sessions and said number of sub-sessions that comprise at least one communication flow, wherein determining intra-session persistence comprises determining an intra-session persistence ratio for each session by dividing the number of sub-sessions comprising at least one communication flow with said total number of sub-sessions for said session, and wherein determining persistence on the basis of said intra-session persistence further comprises comparing the determined intra-session persistence ratio to a threshold value, wherein the first network node is considered to be persistent if said intra-session persistence ratio exceeds the threshold value.

9. A device for detecting persistency of a first network node, the device being arranged to:
monitor, during a specified observation period, whether the first network node has established a connection to a second network node;
determine a total number of sessions of connectivity occurring between the first network node and the second network node during said specified observation period;
determine, from the total number of sessions, the number of sessions that comprise at least one communication flow between the first network node and the second network node;
determine inter-session persistence of the first network node, by determining an inter-session persistence ratio based on dividing the number of sessions that comprise at least one communication flow between the first and second network nodes with said total number of sessions;
determine intra-session persistence of the first network node for at least one session that is divided into a number of sub-sessions, by determining an intra-session persistence ratio based on dividing a number of sub-sessions that comprise at least one communication flow between the first and second networks with said number of sub-sessions; and
consider the first network node to be persistent if either said inter-session persistence ratio exceeds a first threshold value, or if said intra-session persistence ratio exceeds a second threshold value, or both.

10. The device of claim 9, further being arranged to determine the total number of sessions of connectivity by monitoring network attach and detach information of the first network node.

11. The device of claim 9, further being arranged to determine the total number of sessions of connectivity by monitoring packet data protocol (PDP) context information of the first network node.

12. The device of claim 9, further being arranged to determine the sessions of connectivity by monitoring dynamic host configuration protocol (DHCP) requests and releases of the first network node.

13. The device of claim 9, further being arranged to send an alert indicating that the first network node acts persistently.

14. The device of claim 9, further being arranged to record an instant of time when a first communication flow occurs between the first network node and the second network node during the specified observation period.

15. The device of claim 9, further being arranged to aggregate the communication flows between the first network node and the second network node during the specified observation period.

16. A device for detecting persistency of a first network node, being arranged to:
monitor, during a specified observation period, whether the first network node has established a connection to a second network node;
determine a total number of sessions of connectivity occurring between the first network node and the second network node during said specified observation period;
determine, from the total number of sessions, the number of sessions that comprise at least one communication flow between the first network node and the second network node;
determine inter-session persistence of the first network node on the basis of said total number of sessions and said number of sessions comprising at least one communication flow;
divide at least one session into a number of sub-sessions;
determine, for the at least one session, the number of sub-sessions that comprise at least one communication flow between the first network node and the second network node; and
determine intra-session persistence of the first network node for the at least one session on the basis of the number of sub-sessions and the number of sub-sessions that comprise at least one communication flow, by determining an intra-session persistence ratio for each session by dividing the number of sub-sessions that comprise at least one communication flow with said total number of sub-sessions for said session, and comparing the determined intra-session persistence ratio to a threshold value, wherein the first network node is considered to be persistent if said intra-session persistence ratio exceeds the threshold value.

17. The device of claim 16, the device being one of a Gateway General Packet Radio Service (GPRS) Support Node (GGSN), Packet Data Network Gateway (PDN GW), Serving Gateway (SGW), Serving GPRS Support Node (SGSN), Mobility Management Entity (MME), Radio Network Controller (RNC), Base Station Controller (BSC), NodeB, eNodeB, server, user equipment, router, switch or security appliance.

18. A non-transitory computer-readable medium comprising, stored thereupon, computer program code comprising computer-executable components that, when executed by a processing unit of a device, cause the device to:

monitor, during a specified observation period, whether a first network node has established a connection to a second network node;

determine a total number of sessions of connectivity occurring between the first network node and the second network node during said specified observation period;

determine, from the total number of sessions, the number of sessions that comprise at least one communication flow between the first network node and the second network node;

determine inter-session persistence of the first network node on the basis of said total number of sessions and said number of sessions that comprise at least one communication flow, by determining an inter-session persistence ratio based on dividing the number of sessions that comprise at least one communication flow between the first and second network nodes with said total number of sessions;

determine intra-session persistence of the first network node for at least one session that is divided into a number of sub-sessions, by determining an intra-session persistence ratio based on dividing a number of sub-sessions that comprise at least one communication flow between the first and second networks with said number of sub-sessions; and consider the first network node to be persistent if either said inter-session persistence ratio exceeds a first threshold value, or if said intra-session persistence ratio exceeds a second threshold value, or both.

* * * * *